United States Patent
Sakizchi et al.

(10) Patent No.: US 11,015,721 B2
(45) Date of Patent: May 25, 2021

(54) FLOW CONTROL VALVE

(71) Applicants: Vadim M. Sakizchi, Moscow (RU); Snezhana V. Sobolevskaja, Moscow (RU)

(72) Inventors: Vadim M. Sakizchi, Moscow (RU); Snezhana V. Sobolevskaja, Moscow (RU)

(*) Notice: Subject to any disclaimer, the term of this patent is extended or adjusted under 35 U.S.C. 154(b) by 0 days.

(21) Appl. No.: 16/734,519

(22) Filed: Jan. 6, 2020

(65) Prior Publication Data
US 2020/0248820 A1 Aug. 6, 2020

Related U.S. Application Data

(63) Continuation of application No. PCT/RU2017/000503, filed on Jul. 7, 2017.

(51) Int. Cl.
*F16K 3/12* (2006.01)
*F16K 3/02* (2006.01)
(Continued)

(52) U.S. Cl.
CPC ............. *F16K 3/12* (2013.01); *F16K 3/0254* (2013.01); *F16K 3/03* (2013.01); *F16K 3/14* (2013.01);
(Continued)

(58) Field of Classification Search
CPC ... F16K 3/12; F16K 31/52; F16K 3/14; F16K 3/03; F16K 3/0254; F16K 27/047; F16K 31/53; F16K 31/54
(Continued)

(56) References Cited

U.S. PATENT DOCUMENTS

| | | | | |
|---|---|---|---|---|
| 151,863 A | * | 6/1874 | Downs | B65B 39/06 141/317 |
| 2,333,423 A | * | 11/1943 | Hufferd | F16L 37/30 137/614.04 |

(Continued)

FOREIGN PATENT DOCUMENTS

RU  2537081 C1  12/2014

OTHER PUBLICATIONS

International Search Report from PCT/RU2017/000503, dated Jul. 7, 2017, dated Jan. 31, 2018.

*Primary Examiner* — John Bastianelli
(74) *Attorney, Agent, or Firm* — Patentbar International, P.C.

(57) ABSTRACT

The flow control valve has a drive, a housing with a regulating member provided with inlet and outlet fittings with passages and movable and fixed regulating teeth. The flow control valve comprises a composite housing having an upper and lower parts mounted on a support. The lateral surface of the drive disc is provided with Archimedes spiral, the regulating member is provided with evenly spaced projections in the central portion forming the fixed teeth, the movable teeth are located in the spaces between the fixed teeth. All the teeth being formed in a streamlined shape ending with a wedge of the cross-section angle defined as 360/n, n is the number of movable teeth. For engagement between the movable teeth and the drive disc for transmission of motion, a counter plate with notches corresponding to the Archimedes spiral parameters on the drive disc is installed on the movable teeth.

5 Claims, 6 Drawing Sheets

A - A

(51) Int. Cl.
   *F16K 27/04*      (2006.01)
   *F16K 31/53*      (2006.01)
   *F16K 3/03*       (2006.01)
   *F16K 3/14*       (2006.01)
   *F16K 31/52*      (2006.01)

(52) U.S. Cl.
   CPC ............ *F16K 27/047* (2013.01); *F16K 31/52* (2013.01); *F16K 31/53* (2013.01)

(58) Field of Classification Search
   USPC .................................................. 251/58, 212
   See application file for complete search history.

(56) References Cited

U.S. PATENT DOCUMENTS

| | | | | |
|---|---|---|---|---|
| 3,084,898 | A | * | 4/1963 | Miller .................... E21B 33/06 251/1.1 |
| 3,136,525 | A | | 6/1964 | Creasser |
| 3,226,768 | A | * | 1/1966 | Von Zelewsky ....... B22D 17/20 425/566 |
| 3,329,396 | A | * | 7/1967 | Heaton ................... C03B 7/088 251/212 |
| 3,618,925 | A | * | 11/1971 | Girolami ................ B22D 41/24 222/503 |
| 3,787,022 | A | * | 1/1974 | Wilcox .................... F16K 3/03 251/212 |
| 4,094,492 | A | | 6/1978 | Beeman et al. |
| 2015/0041695 | A1 | * | 2/2015 | Daniels ................... F16K 31/53 251/212 |
| 2017/0292616 | A1 | * | 10/2017 | Moens ...................... F16K 3/03 |

* cited by examiner

FLOW CONTROL VALVE

RELATED APPLICATIONS

This Application is a Continuation Application of International Application PCT/RU2017/000503, filed on Jul. 7, 2017, which is incorporated herein by reference in its entirety.

FIELD OF THE INVENTION

The invention relates to devices for controlling working media flow parameters and can be used in facilities of gas, oil, chemical, power, metallurgical and coal industries.

BACKGROUND OF THE INVENTION

A known control valve embodiment comprises a housing provided with inlet and outlet fittings with passages, a ball-type butterfly gate with a narrowed passage having V-shaped profile and a ball-type butterfly gate drive (see http://www.flowserve.com/ru/Products/Valves/control/Ball).

The disadvantage of this embodiment is the violation of the regulated flow axisymmetry in the passage having V-shaped profile, which leads to an increase of the hydraulic resistance in the flow-through part due to significant compression and expansion.

The most common regulators are of the saddle type. The disadvantage is a significant discontinuity of the pumped medium flow due to a change in the passage shape and a large number of structural elements disturbing the uniform flow.

"Mokveld" valve regulator embodiment by Mokveld Valves bv. was taken as a prototype of the invention. It is an axial-type valve, comprising an outer and an inner housings of the same casting, a piston with a rod moving along the longitudinal axis of the valve.

The piston is moved by a transmission consisting of two gear bars arranged at 90° angle to each other, which are respectively parts of the piston rod and the valve stem.

The gear transmission is protected against the influence of the working medium by double primary seals mounted on the piston rod and in its guide.

The disadvantages of this embodiment are as follows:
the speed of the regulating mechanism is limited in view of the shock wave occurrence during the piston movement due to a significant rate response time;
the location of the regulating part in the middle of the flow leads to deformation of uniform flow, especially when gaseous medium used;
regulation is performed due to the movement of the piston, which, in addition to limiting the amount of medium to be passed, alters the nature of this motion and leads to additional flow energy losses;
the gas flow changes its direction when flowing around the working mechanism and 2 more times at an angle of about 90° when passing through the perforation, wherein a significant flow energy loss takes place (at least 30%);
the regulator closing tightness is achieved due to the complete displacement of the piston beyond the perforation and can be broken when foreign objects occur through contaminated pumping medium;
the regulator has a certain flow direction, that is, it can not operate in both directions;
all the structural elements fall under the influence of the flow, which leads to their rapid wear-out.

SUMMARY OF THE INVENTION

The object of the present invention is to increase the valve operation speed, to reduce energy losses, to increase durability, service life and maintainability.

The valve as claimed comprises a drive, a housing with a regulating member provided with inlet and outlet fittings with passages and movable and fixed teeth.

The task is achieved by the fact that the flow control valve comprises a composite housing consisting of an upper part and a lower part mounted on a support, the lateral surface of drive disc is provided with Archimedes spiral, the regulating member is provided with evenly spaced projections in the central portion forming the fixed teeth, the movable teeth are located in the spaces between the fixed teeth, with all the teeth being formed in a streamlined shape ending with a wedge of the cross-section angle defined as 360/n, where n is the number of movable teeth, and to ensure the engagement between the movable teeth and the drive disc for transmission of motion, a counter plate with notches corresponding to the Archimedes spiral parameters on the drive disc is installed on the movable teeth.

DETAILED DESCRIPTION OF THE PREFERRED EMBODIMENTS

Figure 1:
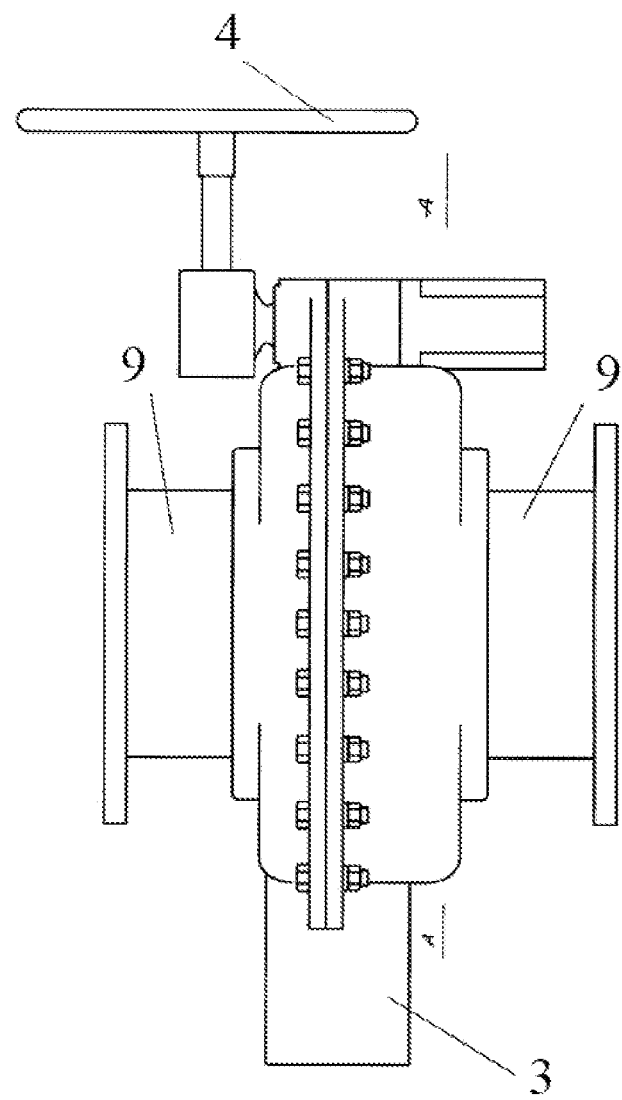
FIG. 1 of the drawings appended shows a general view of a flow control valve as claimed.
Figure 2:
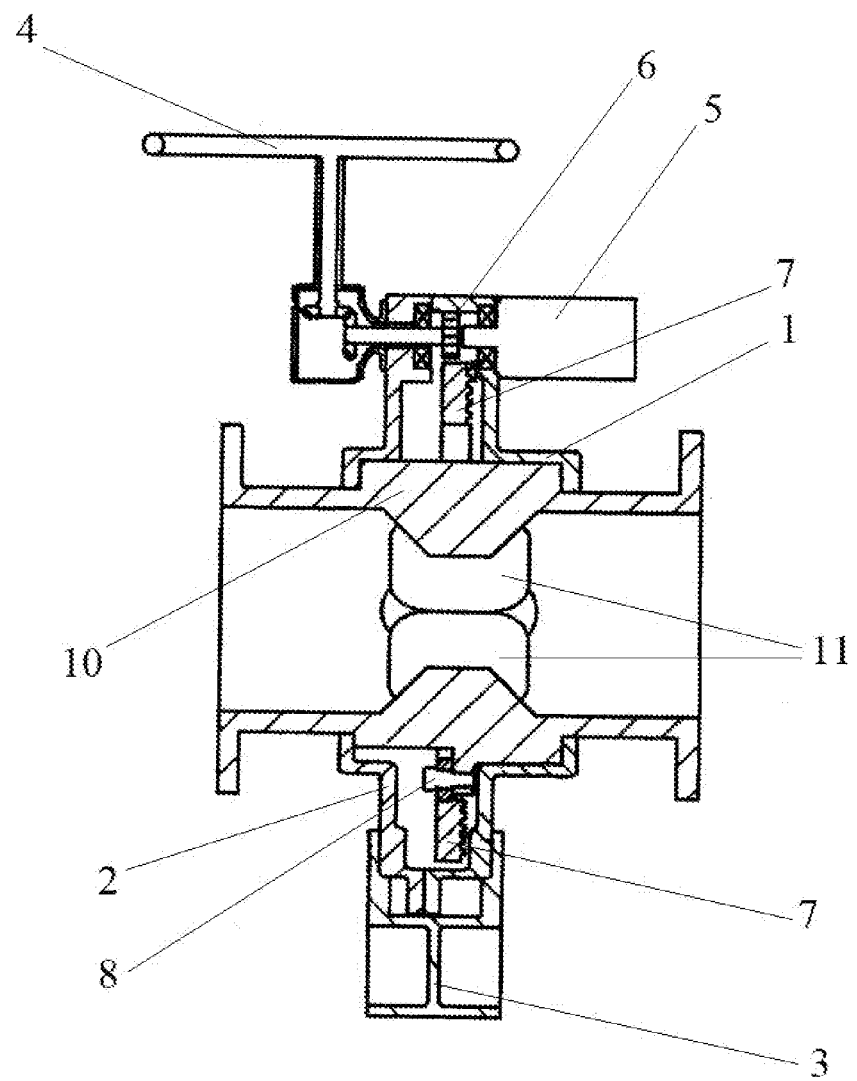
FIG. 2 is a cross-section view of the same.

The flow control valve comprises a composite housing consisting of an upper part 1 and a lower part 2 mounted on a support 3. The upper part 1 of the housing comprises a manual drive with a drive wheel 4, a reducer 5 with gears 6, and a drive disc 7 with Archimedes spiral on its lateral surface. Rollers 8 serve to keep the disc 7 from tilting.

The housing comprises a regulating member 9 with inlet and outlet fittings of the same diameter and evenly spaced projections in the central part forming fixed teeth 10 and movable teeth 11 are placed in between the protrusions, with all the teeth being formed in a streamlined shape ending with a wedge of the cross-section angle defined as 360/n, where n is the number of movable teeth, and to ensure the engagement with the disc the movable teeth are provided with a counter plate 12 with notches corresponding to the Archimedes spiral parameters on the drive disc 7. For stabilizing the movement of the disc 7 guide bushings 13 are provided.

The valve operation is disclosed as follows.

When the drive wheel 4 is put in rotation (when an electric drive according to claim 2 or a pneumatic drive according to claim 3 is turned on), the rotation is transferred to the gears 6 through which the movement is transmitted to the disc 7 engaged with the movable teeth 11 through the counter plate 12. Due to the rotary force applied the movable teeth 11 move along the legs of the fixed teeth 10 symmetrical thereto, moving inboard or outboard, whereby the passage in the transverse plane is closed or opened in a decreasing or increasing multipoint star configuration. Thus, the principle of the flow regulator is the symmetrical movement of the teeth 11 from the periphery to the centre, overlapping the passage of the regulator.

Figure 3:
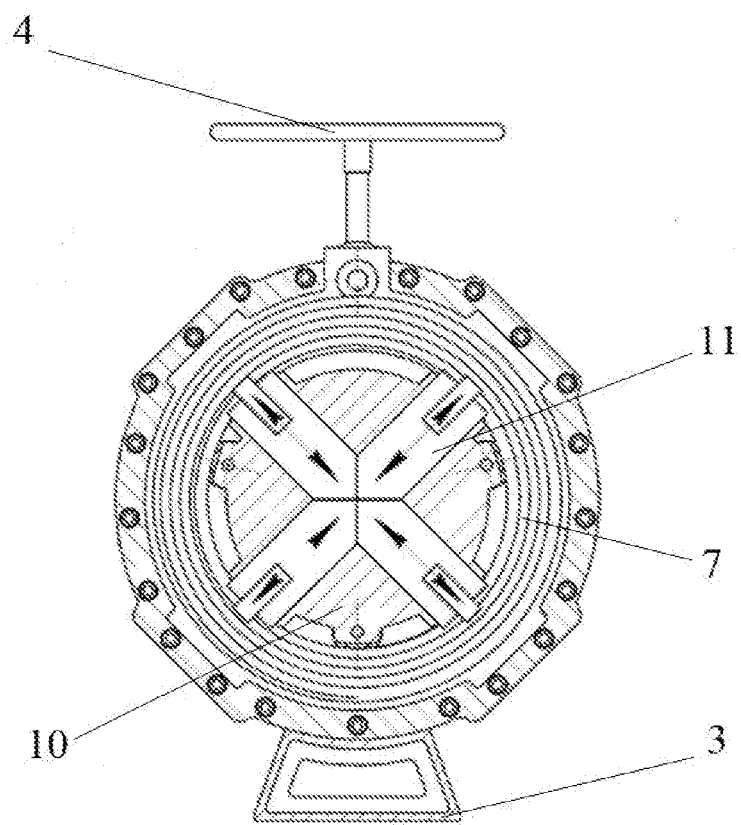
FIG. 3 is a left-side cross-section view of a flow control valve with four pairs of teeth.
Figure 4:
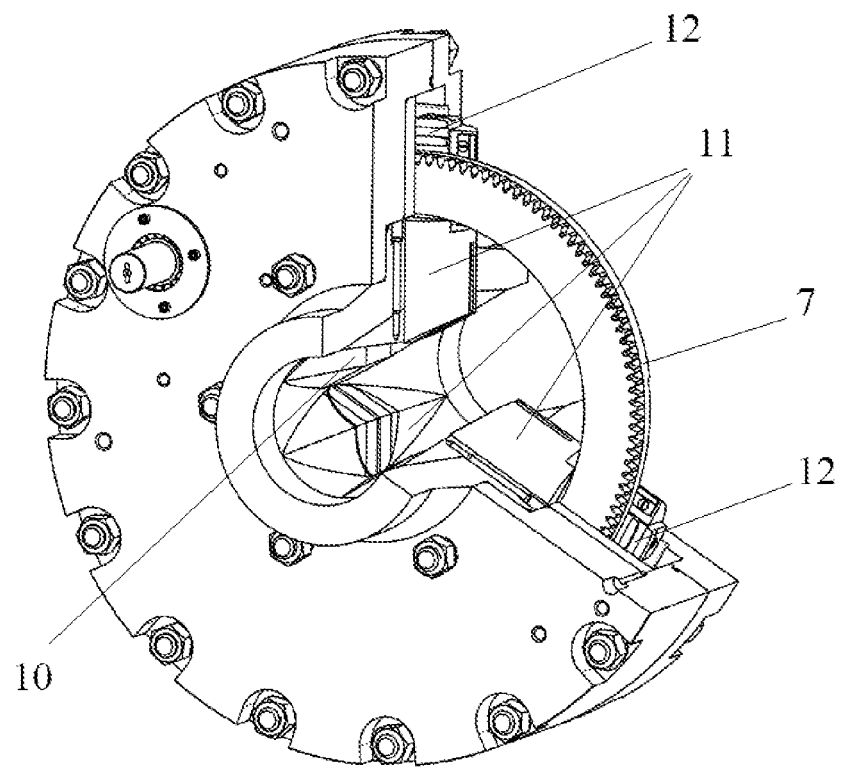
FIG. 4 is a left-side cross-section view of a flow control valve with three pairs of teeth, the flow direction shown with arrows.
Figure 5:
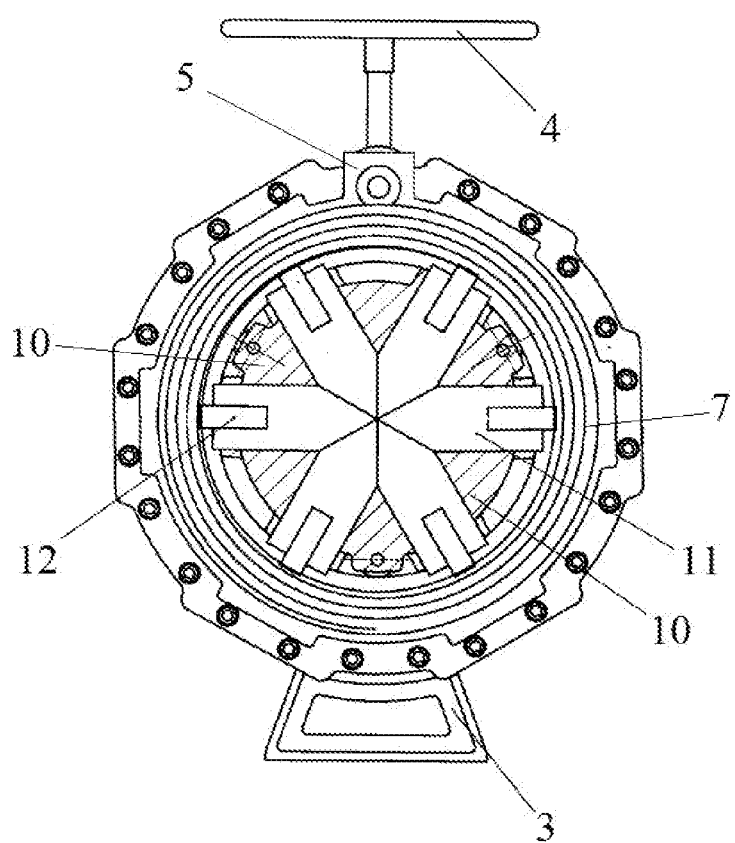
FIG. 5 is a section A-A view of FIG. 1 showing a flow control valve with six pairs of teeth.
Figure 6:
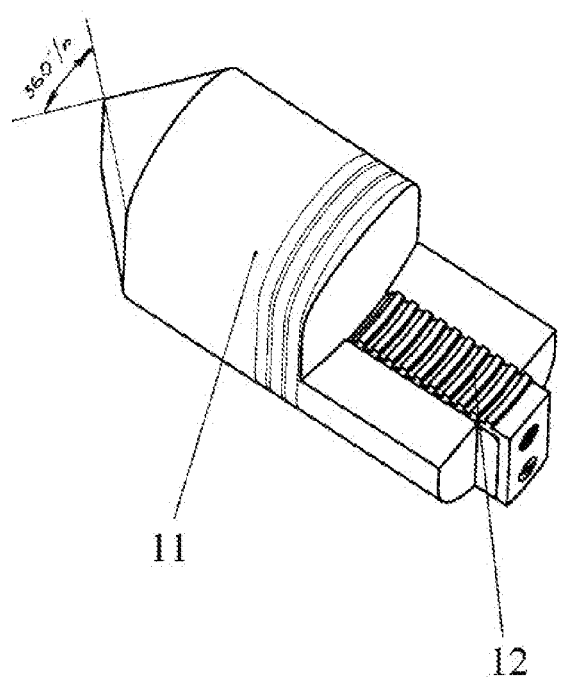
FIG. 6 is a movable tooth of a flow control valve.

The regulator with 4 movable teeth (FIG. 3), (FIG. 6) operates similarly.

The streamlined shape of all elements, as well as the absence of various additional structural elements, which are necessary in other types of regulators, ensures the optimum passage of the medium pumped in the pipeline through this regulator. Regulation takes place only due to changing the passage without disturbing the "pattern" of the medium flow. In addition, the device provides a next lower order level of gas or liquid flow dissipation in comparison to the other regulating devices.

What is claimed is:

1. A flow control valve, comprising;
   a housing having inlet and outlet fittings with passages;
   a regulating member having movable and fixed regulating teeth, the regulating member being provided with evenly spaced projections in a central portion forming the fixed teeth, and the movable teeth being located in spaces between the fixed teeth, the movable teeth having a streamlined shape ending with a wedge, the wedge having a cross-section angle defined as 360/n, wherein n is a number of movable teeth;
   a drive having a drive disc in which a lateral surface of the drive disc is provided with an Archimedes spiral; and
   a counter plate, installed on the movable teeth, having notches engaging the Archimedes spiral, such that as the drive disc is rotated, engagement between the Archimedes spiral of the disc drive with the counter plate of the movable teeth provides transmission of linear motion of the movable teeth to move the wedges on the movable teeth towards and away from one another.

2. The flow control valve of claim 1, wherein the lateral surface of the movable teeth are provided with self-sealing inserts.

3. The flow control valve of claim 1, wherein the drive is an electric drive.

4. The flow control valve of claim 1, wherein the drive is a pneumatic drive.

5. The flow control valve of claim 1, wherein the housing is composite.

* * * * *